United States Patent [19]
Bonnaval-Lamothe et al.

[11] Patent Number: 5,027,113
[45] Date of Patent: Jun. 25, 1991

[54] PROCESS FOR SIMULTANEOUSLY CHECKING THE AUTHENTICITY OF INFORMATION MEDIA AND THE AUTHENTICITY OF THE INFORMATION ITSELF

[75] Inventors: Michel Bonnaval-Lamothe, "Côte Belle", 33410 Cadillac sur Garonne; Renaud Marchand, Lastresne, both of France

[73] Assignee: Michel Bonnaval-Lamothe, Cadillac sur Garonne, France

[21] Appl. No.: 570,994

[22] Filed: Aug. 21, 1990

Related U.S. Application Data

[63] Continuation of Ser. No. 208,494, Jun. 20, 1988, abandoned.

[30] Foreign Application Priority Data

Jun. 18, 1988 [FR] France ............................ 87 08768

[51] Int. Cl.$^5$ .......................... G07D 7/00; G06K 5/00
[52] U.S. Cl. ............................ 340/825.34; 235/380; 235/382; 382/2
[58] Field of Search ............... 340/825.34; 235/454, 235/493, 449, 380, 381, 382; 382/2

[56] References Cited

U.S. PATENT DOCUMENTS

| | | | |
|---|---|---|---|
| 4,179,686 | 12/1979 | Bonicalzi et al. | 340/146.3 |
| 4,396,902 | 8/1983 | Warthan et al. | 235/449 |
| 4,423,415 | 12/1983 | Goldman | 340/825.34 |
| 4,469,937 | 9/1984 | Stockburger et al. | 235/435 |
| 4,568,936 | 2/1986 | Goldman | 340/825.34 |
| 4,748,679 | 5/1988 | Gold et al. | 340/825.34 |
| 4,806,740 | 2/1989 | Gold et al. | 235/449 |
| 4,811,408 | 3/1989 | Goldman | 382/2 |

FOREIGN PATENT DOCUMENTS 00776  3/1981  Fed. Rep. of Germany.
2370328  6/1978  France.

Primary Examiner—Palmer C. DeMeo
Assistant Examiner—Yuk H. Lau
Attorney, Agent, or Firm—Fulbright & Jaworski

[57] ABSTRACT

A process for simultaneously checking the authenticity of information media and the authenticity of the information itself which involves scanning a portion of the information written on the media. The results of the scan are transformed into an electrical signal. The signal is analyzed by an appropriate algorithm that registers variations between the information as actually written and a theoretically perfect writing of the same information. The results of this analysis can be stored in the memory of the scanning apparatus or directly onto the media. Then each time the media is handled, the same section of information is rescanned, identically analyzed, and compared to the stored results of the initial scan.

12 Claims, 2 Drawing Sheets

PROCESS FOR SIMULTANEOUSLY CHECKING THE AUTHENTICITY OF INFORMATION MEDIA AND THE AUTHENTICITY OF THE INFORMATION ITSELF

This application is a continuation of application Ser. No 208,494 filed June 20, 1988 now abandoned.

BACKGROUND OF THE INVENTION

1. Field of the Invention

The present invention describes a process for simultaneous verification of the authenticity of any kind of information media and information it contains.

2. Description of the Related Technology

U.S. Pat. No. 4,423,415 teaches a process for authenticating an object which includes measuring certain specific physical characteristics of an object in a predetermined zone and coding these characteristics on the object in order to check the code and verify the objects authenticity. This process is accomplished by a special device adapted to measure the appropriate physical characteristics in the predetermined zone, encode this data according to the same algorithm, and compare this data with the data recorded on the object. The characteristics to be measured are characteristics that together are never identical on all points. This patent is particularly useful when the object to be verified is a paper document. The specifics of each paper document are inherent in the composition of the paper itself, particularly the transparency and reflectivity of the paper.

This process effectively permits one to verify that a certain paper document is authentic and no one has tampered with the document within the predetermined zone from which the physical characteristics were recorded since they were recorded.

Still, this process has a serious handicap because it cannot guarantee, when used on paper documents for example, that the information recorded on the paper has not been tampered with after the initial recordation of data.

U.S. Pat. Nos. FR-A-2,370,328 and wO-A-8100776, contrary to U.S. A-4,423,415 teach processes for controlling document authenticity for information that was added after the data was sampled and the document was placed in service. This involves sampling a part of the information in view on the document during a check and comparing this data, saved in memory or encoded on the document itself with the same information from each previous samplings similarly saved or encoded.

Patents FR-A-2,370,328 and WO-A-8100776 are not really an improvement of U.S. Pat. No. 4,423,415 because they not take into account any characteristics of the supporting media for the information. Thus the information could be falsified or substituted later.

SUMMARY OF THE INVENTION

The present invention is armed at alleviating the problems with the previous inventions. It permits a sampling of characteristics of the information and its media at the same time; characteristics that are inseparable from the information and its supporting media because they are the result of imprinting the information on the media. Such characteristics are unique and irreproducible.

The process of the present invention permits checking the authenticity of the information media and the authenticity of the information itself. The appropriate characteristics of the recorded information are sampled. The sampling device translates all the information from the samples and the information encoded on the media into an electric signal. All the sampling is done according to an algorithm that directs a calculation of the faults of the imprint of the information on the media. The characteristics representing deviation of the actual image from the ideal image are then saved to memory or encoded on the media itself. Each time the media is rechecked, the sampled information is compared with the contemporaneous sample of the same information.

Such a process is applicable in many ways, for example to printed documents as well as magnetic media. For printed documents, a camera, preferably a charge coupled device, is the sampling instrument. In the case of magnetic media, the sampling instrument would be the appropriate magnetic read/write head.

The process of the invention permits taking into consideration the imprint the information makes on its recording media, something that is unique and irreproducible.

Now we would like to describe in greater detail the process of the invention, with the aid of several examples, as practiced with information captured on different forms of media.

DETAILED DESCRIPTION OF THE PREFERRED EMBODIMENT

Figure 1:
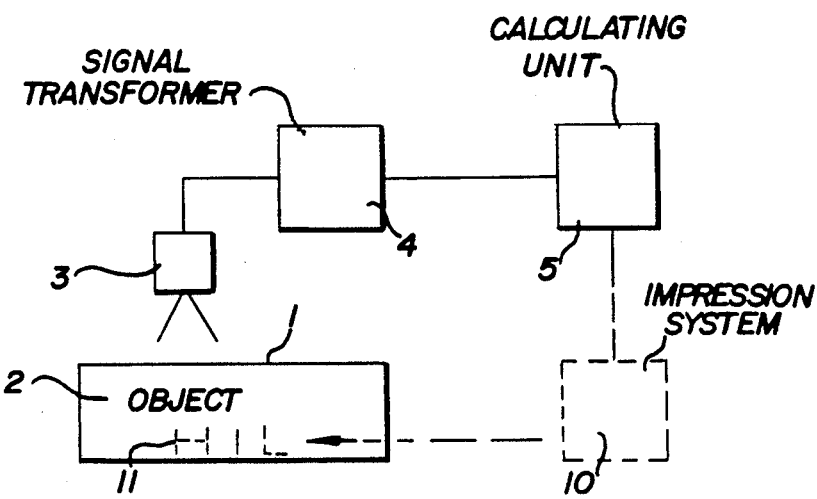
FIG. 1 of the drawings represents schematically a reading machine for applying the described process to paper documents.

In FIG. 1, (1) is a paper document bearing printed information (2)—the word "OBJECT." The document is scanned by the camera (3), possibly a video camera, that relays the information to a signal transformer (4) that changes the camera signal into binary information. This information is then relayed to the calculating unit (5).

In this application, the process of the invention consists of taking into consideration the imprint of the letters of the word "OBJECT" on the supporting paper. The imprint is characterized by the irregularities of the contour of the letter printed on the document (1) with the help of the camera (3). The camera is focused on the word "OBJECT" (2). The signal transformer (4) translates the signal to binary code and passes it to the calculating unit (5).

Figure 2:
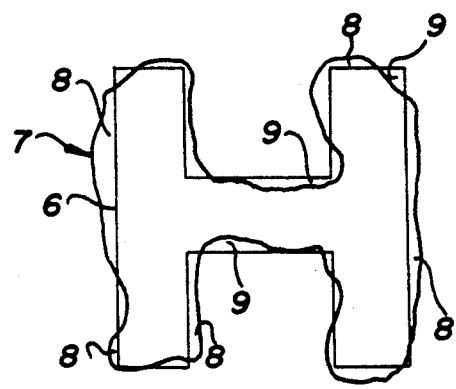
FIG. 2 illustrates the phenomenon of peripheral diffusion of ink into the supporting media for a printed letter.

FIG. 2 illustrates the irregularities in the contours of a letter printed on paper. The theoretical, ideal form is represented by the block "H" (6). The wavy "H" (7) is how the letter really appears as revealed by the scanning camera. The contours are the result of the migration in the paper of the ink particles.

At high magnification it is obvious that no two printed letters are the same. This is the case for the same letter printed on the same piece of paper with the same printing means. Each letter's imprint is a unique signature that cannot be reproduced.

In the embodiment described in FIG. 1, the imprint left on the paper (1) by the type for the word "OBJECT" is analyzed. This is done by an image treatment algorithm that analyzes the differences between the theoretically ideal letters and the letters as they appear.

Among the suitable algorithms and this is not a limiting list, are those utilized to analyze all curves, the method of histograms, the method of derivatives, the method of statistics, the method of projections. All these methods are known by those in the art and do not need to be described in detail.

The following is a description of using an algorithm with the contour analysis method. First, the camera (3) scans the word "OBJECT." The signal transformer (4) then send a signal containing the code of the contours of the letter to the calculating unit (5). The calculating unit transforms the signal of the contoured letter by comparing it with the signal of the "perfect" letter. In the case of the letter "H" in FIG. 2, the. camera would read the letter in its wavy form (7) and the calculating unit (5), would compare the signal from this form (7) with the ideal form (6) and transform the signal accordingly. This operation is done in the calculating unit by an appropriate program that takes into account the ideal form of all the possible signs that might me encountered. This program matches the signal for the most ideal form in its memory for the signal the signal transformer (4) sends of what the camera (3) actually scans. It is, of course, necessary that the camera (3) scan a sufficient number of pixels to characterize each printed sign uniquely and unequivocally.

The signal transformation retains only the deviations from the ideal. The controlling algorithm could search, for example, the n largest surfaces corresponding to positive or negative deviations. The positive or negative sign represents the direction of the deviating curve from ideal line. In FIG. 2, the curve (8) represents many distinct positive deviations. and the curve (9) represents negative deviations.

The controlling algorithm calculates the position of these n selected surfaces (8) and (9). This information represents the significant elements characterized by sign of the information scanned by the camera (3). This information will be referred to, from now on, as "control information."

The camera (3) can scan one or many signs, characters, symbols, or images.

The control information produced by the calculating unit can be dealt with in a number of ways. It can be stored in the memory of the calculating unit for later checks of the document (1) by the same system. It can be sent to other identical scanning/comparison system for storage in the memory of their calculating units. It can be encoded and stored in any kind of graphic design imprinted on the document (1) itself in an appropriate place preferable within the field of view of the camera (3).

The ensemble (3-4-5) of camera (3), signal transformer (4), and calculating unit (5) can be used to produce control information and to verify it. The verification process merely involves passing the document through the ensemble (3-4-5) and comparing the previously recorded Control information with the new control information and registering the results of the comparison.

In the case where the ensemble (3-4-5) is used to encode the control information that has just been generated on a document (1), the calculating unit (5) is connected to an impression system (10). The calculating unit (5) tells the impression system (10) to print a coded graphic representation (11) of the control information on the document (i).

Verification of an encoded document is accomplished by again passing the document through the ensemble (3-4-5) or through another identical, but totally independent ensemble. When the document passes through the ensemble, the camera scans the information (2), and the encoded control information (11) at the same time. The calculating unit (5) compares the new control information it generates from re-scanning the information (2) with the previously generated and encoded information (11). The calculating unit then determines and displays by an appropriate method the results of this comparison.

Encoding the control information can be accomplished at any time It can occur before the document is placed in service, or at any time during the life of the document. This encoding can also be used to certify a copy of the original.

The system just described applies particularly to checks, but could just as easily be used with any analogous paper document, such as official documents of identification or other information. The control information can be clearly affixed or encoded, it can be printed or &make any other convenient form.

Figure 3:
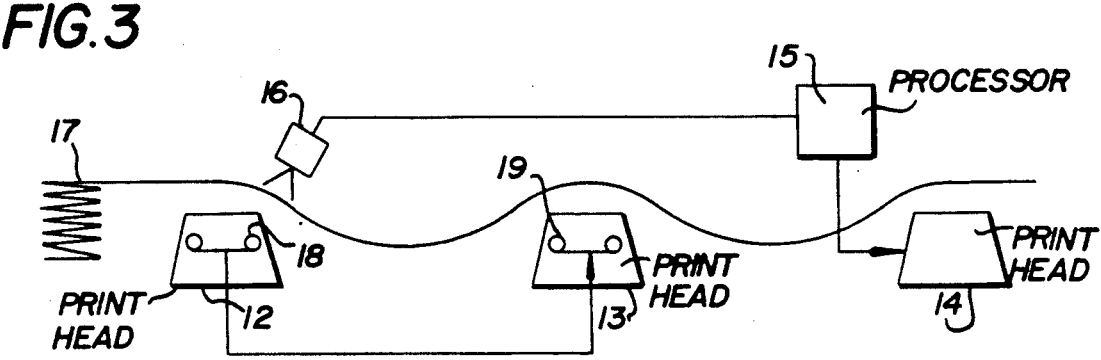
FIG. 3 represents schematically a sampling/encoding machine used during the production of checks to encode information according to the invention.

FIG. 3 represents the process applied to checks. In this embodiment, the control information is integrated into the information normally printed on a check. The ordinary print head (12) is followed by the second print head (13) which imprints the characters CMC7, which is in turn followed by a third print head (14) which prints the information encoded from the camera (16). The camera (16) scans the appropriate information on the checks immediately downstream from the ordinary print head (12).

Blank checks to be personalized are fed continuously past the ordinary print head (12). The ordinary print head (12), using a know technique, transfers the personal information from a magnetic band (18) and prints it in the area of the check reserved for this information.

The checks then pass the second print head (13) which imprints the characters CMC7 on the check. The second print head can use the same technique of transferring characters from a magnetic band (19). Finally, the checks pass by the third print head (14) that imprints encoded information, for example the coded control information represented by the graphic (11) of FIG. 1, or any other graphic of the same genre.

The camera (16) is analogous to the camera (3) of FIG. 1, and scans, at the very least, a part of the personal information printed by the ordinary print head (12).

The image coming from this camera (16) is processed in the same way as the image from the camera (3) in the system in FIG. 1. The image is transformed in the processor (15) through an appropriate algorithm to produce control information.

The third print head (14) receives the coded control information from the processor (15), and prints a graphic representation of the coded control information in the zone of the check reserved for personal information. Preferably, this graphic representation is printed close to characters that the coded control information is derived from. Thus, each time the check is checked by a system, like that represented by the ensemble (3-4-5) of FIG. 1, the camera (3) simultaneously scans the same printed characters whose characteristics were originally scanned, and the coded control information derived from the initial scan.

The processor (15), of course, is limited by the speed of the third print head (14). The ordinary print head and the second print head are limited by the parameters of the chosen detection system.

The ensemble (14-15-16) of FIG. 3 can be integrated into any kind of system for printing checks for a negligible cost.

Note that the third print head (14) can be replaced by the second print head by adjusting the sequence of the printing process accordingly.

Figure 4:
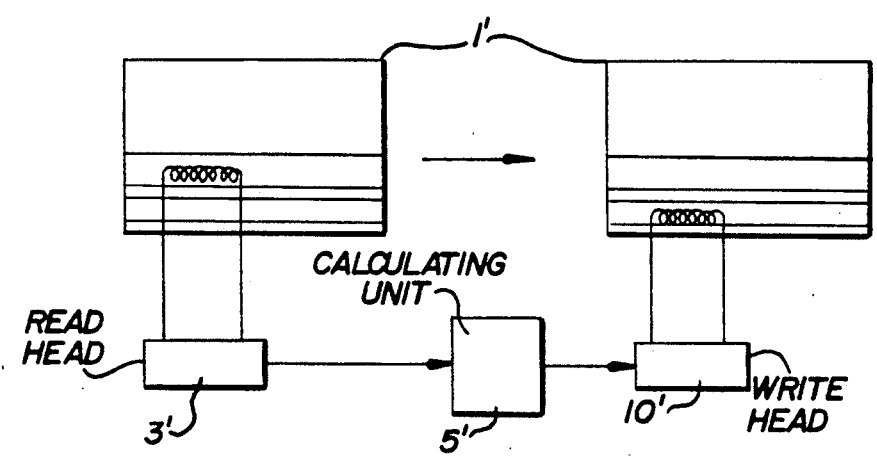
FIG. 4 illustrates the invention used in a situation where the media supports magnetic tracks of information.

FIG. 4 represents the process applied to and form of magnetic media, for example cards with magnetic strips.

Magnetically encoded information leaves on the supporting media an imprint o signature that is unique and irreproducible. This is because the same information cannot be identically written by the same means on the same kind of supporting media.

This embodiment uses a system analogous to that of FIG. 1. In this embodiment the camera (3) is replaced by a magnetic read head (3') and the impression system (10) is replaced by a magnetic write head (10').

The read head (3') reads all or part of the magnetic information carried in recorded tracks on the magnetic media carrying card (1') that pass under it. The signal generated by the read head is treated by the calculating unit (5'). From the signal, the calculating unit (5') extracts the signal considered as the ideal signal that has previously been stored in the calculating unit's memory. The calculating unit (5') then proceeds to measure the deviations of the actual signal from the ideal signal. These deviations can be calculated in a number of different ways, for example, bY selecting the n largest surface deviations and generating the control information from them in a manner similar to described for the embodiment of FIG. 1. Along independent control systems, of coded onto the recorded tracks themselves in a waY analogous to that of the encoded control information (11) of FIG. 1. MagneticallY encoded control information could be recorded by the write head (10') on the magnetic media of a second track.

A difference between the embodiment of FIG. 1 and this embodiment is that the magnetic media carrying card (1') passes in front of the read head (3') while the camera (3) records the entire view instantaneously.

Of course, the encoded control information recorded by the write head (10') will be read by the read heads of every system that checks the document.

Note that the reading and writing operations can be done at the same position by a combination read/write head.

Note also that the process is applicable to any sign or signal, be it graphic, magnetic, or electronic, that is recorded on any kind of media.

Another possible application would be to verify photographs. In the case of a photograph, the entire photograph would be read by a camera connected to a signal transformer. The signal transformer would be connected to a processor. The processor would then calculate, for example, in a histogram, the variation of the distribution of gray levels in the image scanned by the camera.

The encoded control information can be recorded on the support media by any known method, be it ink, pigment, or anything else that will produce an irreproducible "signature." The encoded control information can also be recorded by removing a portion of the support media or by an impression, for example a raised seal.

In this description of the invention, the term media means any kind of support that can receive information in one of the embodiments described above.

We claim:

1. A process for authenticating an information media and information located on the media comprising the steps of:

scanning a portion of said information located on said media and transforming it into a first sampling in the form of an electrical signal, recognizing said information from said first sampling, processing said first sampling by an algorithm that takes into consideration unique deviations of an actual configuration of said information of said media from an expected configuration of said information to produce a characterized first sampling, saving said characterized first sampling in memory or by recording directly on said media, scanning said actual configuration of said information under the same conditions and transforming it into a successive sampling in the form of an electrical signal, recognizing said information from said successive sampling, and processing said successive sampling by said algorithm to produce a characterized successive sampling, comparing said characterized first sampling with said characterized successive sampling.

2. A process according to claim 1 wherein said information comprises graphic images, or letters of the alphabet, or numerals, or representational signs or symbols, and said samplings comprise one or may of said graphic images.

3. A process according to claims 1 wherein said information is written on the media by physical means, or with ink, or with a pigment, or by magnetic means.

4. A process according to claim 1 wherein said characterized first sampling is recorded directly on said media by removing part of the media, or by a raised seal.

5. An authenticating apparatus comprising:

a reading means for scanning samplings of information on a media and transforming them into a first sampling electrical signal, a signal transformer connected to said reading means, and a processing means connected to said signal transformer comprising at least:

means for recognizing said information, and means for processing said first sampling by a protocol that takes into consideration unique deviations of an actual configuration of said information on said media from an expected configuration of said recognized information, thereby generating a characterized sampling.

6. An authenticating apparatus according to claim 5, wherein:

said reading means is a camera and said processor means further comprises means for comparing said characterized sampling to a reference and connected to means for displaying results of said comparison.

7. An authenticating apparatus according to claim 6, further comprising a printing means connected to said processor means for printing said characterized sampling directly on a paper document.

8. An authenticating apparatus according to claim 7 further comprising:
a printing means for printing personalized information,
a camera placed directly after said printing means for scanning the personalized information printed by said printing means, and
a second printing means connected to said camera via said processor to print said characterized first sampling directly on a check.

9. An authenticating apparatus according to claim 5 wherein:
said reading means is a magnetic signal reading means, connected to said signal,
said processor means is connected to a means for displaying results of a comparison of said characterized sampling with a reference characterized sampling.

10. An apparatus as described in claim 9, further comprising:
a magnetic signal writing means connected to said processor means for writing said characterized sampling generated by said processor on a second track of said magnetic media.

11. A process according to claim 2 wherein said information is written on the media by physical means, or with ink, or with a pigment, or by magnetic means.

12. A process according to claim 1 wherein said information is recorded directly on said media by removing part of the media, or by a raised seal.

* * * * *